(12) United States Patent
Kim

(10) Patent No.: US 11,202,173 B2
(45) Date of Patent: Dec. 14, 2021

(54) TERMINAL POSITION MEASURING DEVICE AND TERMINAL POSITION MEASURING METHOD

(71) Applicant: SK TELECOM CO., LTD., Seoul (KR)

(72) Inventor: Chong Won Kim, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 1 day.

(21) Appl. No.: 16/648,380

(22) PCT Filed: Sep. 12, 2018

(86) PCT No.: PCT/KR2018/010691
§ 371 (c)(1),
(2) Date: Mar. 18, 2020

(87) PCT Pub. No.: WO2019/054752
PCT Pub. Date: Mar. 21, 2019

(65) Prior Publication Data
US 2020/0267504 A1    Aug. 20, 2020

(30) Foreign Application Priority Data
Sep. 18, 2017  (KR) .................. 10-2017-0119587

(51) Int. Cl.
*H04W 4/029*    (2018.01)
*G01S 19/11*    (2010.01)
(Continued)

(52) U.S. Cl.
CPC ............... *H04W 4/029* (2018.02); *G01S 5/02* (2013.01); *G01S 19/00* (2013.01); *G01S 19/01* (2013.01);
(Continued)

(58) Field of Classification Search
CPC ....... H04W 4/029; H04W 64/00; H04W 4/33; G01S 19/11; G01S 19/12; G01S 19/46;
(Continued)

(56) References Cited

U.S. PATENT DOCUMENTS 5,307,507 A * 4/1994 Kanai .................. H04W 16/02
455/447
2002/0086684 A1   7/2002 Pande et al.
(Continued)

FOREIGN PATENT DOCUMENTS

JP    2008-504526    2/2008
JP    2011-013132    1/2011
(Continued)

OTHER PUBLICATIONS

Korean Office Action dated Mar. 17, 2020 issued in Application No. 10-2017-0119587 (English translation attached).
(Continued)

*Primary Examiner* — Fred A Casca
(74) *Attorney, Agent, or Firm* — Ked & Associates LLP

(57) ABSTRACT

Disclosed is a technology for increasing a positioning success rate and reducing a positioning error with high reliability by proposing an improved positioning scheme based on virtual satellites capable of improving DOP and removing an error in a satellite measurement value when a location of a terminal in an inadequate environment such as downtown/indoors near a window is measured.

14 Claims, 5 Drawing Sheets

(51) Int. Cl.
    *G01S 19/12*     (2010.01)
    *H04B 7/185*     (2006.01)
    *G01S 19/00*     (2010.01)
    *G01S 19/01*     (2010.01)
    *G01S 5/02*     (2010.01)
    *G01S 19/25*     (2010.01)
    *H04B 17/318*     (2015.01)
    *H04B 7/06*     (2006.01)

(52) U.S. Cl.
    CPC .............. *G01S 19/11* (2013.01); *G01S 19/12* (2013.01); *G01S 19/252* (2013.01); *H04B 7/185* (2013.01); *H04B 7/1851* (2013.01); *H04B 17/318* (2015.01); *H04B 7/0617* (2013.01)

(58) Field of Classification Search
    CPC .... G01S 19/396; G01S 19/252; G01S 5/0252; G01S 5/02; G01S 19/01; G01S 5/0257; G01S 19/00; H04B 7/1851; H04B 7/185; H04B 17/318
    See application file for complete search history.

(56) References Cited

U.S. PATENT DOCUMENTS

| | | | |
|---|---|---|---|
| 2005/0130590 A1* | 6/2005 | Pande | H04B 7/2693 |
| | | | 455/12.1 |
| 2010/0026566 A1* | 2/2010 | Ueda | G01S 19/42 |
| | | | 342/357.36 |
| 2010/0182195 A1* | 7/2010 | Garin | G01S 5/0284 |
| | | | 342/357.22 |
| 2013/0304376 A1* | 11/2013 | Park | G01S 19/08 |
| | | | 701/491 |

FOREIGN PATENT DOCUMENTS

| | | |
|---|---|---|
| KR | 10-2004-0079120 | 9/2004 |
| KR | 10-2008-0065113 | 7/2008 |
| KR | 10-2012-0032813 | 4/2012 |
| KR | 10-2014-0142610 | 12/2014 |

OTHER PUBLICATIONS

International Search Report dated Dec. 21, 2018 issued in Application No. PCT/KR2018/010691.

* cited by examiner

TERMINAL POSITION MEASURING DEVICE AND TERMINAL POSITION MEASURING METHOD

CROSS-REFERENCE TO RELATED PATENT APPLICATIONS

This application is a U.S. National Stage Application under 35 U.S.C. § 371 of PCT Application No. PCT/KR2018/010691, filed Sep. 12, 2018, which claims priority to Korean Patent Application No. 10-2017-0119587, filed Sep. 18, 2017, whose entire disclosures are hereby incorporated by reference.

BACKGROUND OF THE INVENTION

1. Field of the Invention

The present disclosure relates to a positioning technology for measuring (estimating) a location of a terminal, and more particularly to an improved positioning scheme which can increase a positioning success rate and reduce a positioning error with high reliability.

2. Description of the Prior Art

The most widely used positioning technology for measuring a location of a positioning target (for example, a terminal) is a Global Navigation Satellite System (GNSS) positioning scheme.

The GNSS positioning scheme is a scheme for deriving a positioning result on the basis of a satellite measurement value obtained by measuring a satellite signal, where the satellite signal is received from a satellite by a GNSS receiver included in the positioning target, that is, the terminal.

The GNSS positioning scheme includes various schemes to detect and remove an error in a satellite measurement value by the GNSS receiver thereby reducing a positioning error, and a representative scheme thereof is a Receiver Autonomous Integrity Monitoring (RAIM) scheme.

The RAIM scheme is a scheme for calculating a residual using the positioning result and detecting an error in the satellite measurement value using a statistical characteristic of the residual.

In an inadequate actual environment such as downtown/indoors near a window, a satellite measurement value may have an error due to complex multiple paths. In the case of the RAIM scheme, there is a difficulty in detecting the error in the satellite measurement value due to such multiple paths.

Further, the number of visible satellites which can be actually used for positioning may be insufficient in downtown/indoors near a window, so that positioning itself may be impossible and thus a success rate deteriorates.

Accordingly, the present disclosure proposes an improved positioning scheme which can increase a positioning success rate even when a location of a terminal is determined in an inadequate environment such as downtown/indoors near a window and accurately detect an error in a satellite measurement value.

SUMMARY OF THE INVENTION

An aspect of the present disclosure is to realize an improved positioning scheme which can increase a success rate of positioning a terminal and accurately detect an error in a satellite measurement value.

In accordance with an aspect of the present disclosure, an apparatus for positioning a terminal is provided. The apparatus includes: a virtual satellite configuration unit configured for configuring virtual satellites for a specific terminal using a Base Station (BS) coordinate of a serving BS related to the specific terminal; and a positioning unit configured to perform a positioning procedure of estimating a location of the specific terminal, based on pseudo distance measurement values of actual satellites measured by the specific terminal and distance measurement values of virtual satellites generated for the virtual satellites.

Specifically, the virtual satellite configuration unit may configure virtual satellites on the basis of a coordinate value of the BS coordinate for each directional axis in a three-dimensional coordinate space having an initial location coordinate or a location coordinate estimated during the previous positioning procedure as the origin.

Specifically, the positioning unit may be configured to calculate and generate the distance measurement values of the virtual satellites, based on an initial location coordinate of the specific terminal or a location coordinate estimated in a previous positioning procedure, and coordinates of the configured virtual satellites.

Specifically, the positioning unit may be configured to estimate a location coordinate of the specific terminal using at least one formula matrix configured based on a pseudo measurement value of the actual satellite and a distance measurement value of the virtual satellite and a predefined weight matrix and, when a difference between the estimated location coordinate and an initial location coordinate of the specific terminal or a location coordinate estimated in a previous positioning procedure is within a preset specific range, output the estimated location coordinate as a positioning result of the specific terminal.

Specifically, when the difference between the estimated location coordinate and the initial location coordinate of the specific terminal or the location coordinate estimated in the previous positioning procedure is out of the specific range, the positioning unit may be configured to perform the positioning procedure of the specific terminal again.

Specifically, the weight matrix may be defined to apply a lower weighted value to a value related to a virtual satellite compared to an actual satellite.

Specifically, the apparatus may further include a measurement value filtering unit configured to calculate a residual for each of actual satellites and virtual satellites used in the positioning procedure, based on a location coordinate output as a positioning result in the positioning procedure for the specific terminal and, when a combination of the calculated residuals or a maximum size of the residual is larger than or equal to a preset threshold value, perform a different measurement value filtering procedure according to whether the maximum size of the residual is calculated for an actual satellite or a virtual satellite.

Specifically, when the maximum size of the residual is calculated for the virtual satellites, the measurement value filtering unit may be configured to perform the positioning procedure for the specific terminal again after removing remaining virtual satellites other than a specific virtual satellite configured in an altitude direction of the specific terminal among virtual satellites used for the positioning procedure.

Specifically, the apparatus may further include a result filtering unit configured to calculate a residual for each of actual satellites and virtual satellites used for the positioning procedure, based on a specific location coordinate output as a final positioning result after the measurement value filtering procedure, and finally filter whether there is an error in the final positioning result, based on the calculated residual and an altitude value according to the specific location coordinate.

In accordance with another aspect of the present disclosure, a method of positioning a terminal is provided. The method includes: a virtual satellite configuration step of configuring virtual satellites for a specific terminal using a BS coordinate of a serving BS related to the specific terminal; and a positioning step of performing a positioning procedure of estimating a location of the specific terminal, based on pseudo distance measurement values of actual satellites measured by the specific terminal and distance measurement values of virtual satellites generated for the virtual satellites.

Specifically, the positioning step may include: a step of calculating and generating the distance measurement values of the virtual satellites, based on an initial location coordinate of the specific terminal or a location coordinate estimated in a previous positioning procedure, and coordinates of the configured virtual satellites; a step of estimating a location coordinate of the specific terminal using at least one formula matrix configured based on a pseudo measurement value of the actual satellite and a distance measurement value of the virtual satellite and a predefined weight matrix; a step of, when a difference between the estimated location coordinate and an initial location coordinate of the specific terminal or a location coordinate estimated in a previous positioning procedure is within a preset specific range, outputting the estimated location coordinate as a positioning result of the specific terminal; and a step of, when the difference is out of the specific range, performing the positioning procedure of the specific terminal again.

Specifically, the weight matrix may be defined to apply a lower weighted value to a value related to a virtual satellite compared to an actual satellite.

Specifically, the method may further include a measurement value filtering step of calculating a residual for each of actual satellites and virtual satellites used in the positioning procedure, based on a location coordinate output as a positioning result in the positioning procedure of the specific terminal and, when a combination of the calculated residuals or a maximum size of the residual is larger than or equal to a preset threshold value, performing a different measurement value filtering procedure according to whether the maximum size of the residual is calculated for an actual satellite or a virtual satellite.

Specifically, when the maximum size of the residual is calculated for the virtual satellites, the measurement value filtering step may include performing the positioning procedure for the specific terminal again after removing remaining virtual satellites other than a specific virtual satellite configured in an altitude direction of the specific terminal among virtual satellites used for the positioning procedure.

Specifically, the method may further include a result filtering step of calculating a residual for each of actual satellites and virtual satellites used for the positioning procedure, based on a specific location coordinate output as a final positioning result after the measurement value filtering procedure and finally filtering whether there is an error in the final positioning result, based on the calculated residual and an altitude value according to the specific location coordinate.

In accordance with another aspect of the present disclosure, a method of positioning a terminal is provided. The method includes: a determination step of determining whether a number of satellites available for positioning a specific terminal is smaller than a threshold number; a virtual satellite configuration step of configuring virtual satellites using a reference coordinate related to the specific terminal when the number of satellites is smaller than the threshold number; and a positioning step of performing a positioning procedure of estimating a location of the specific terminal using the satellites and the virtual satellites.

Through an apparatus for positioning a terminal and a method of positioning a terminal according to the present disclosure, an effect of increasing a positioning success rate and reducing a positioning error with high reliability can be accomplished.

DETAILED DESCRIPTION OF THE EXEMPLARY EMBODIMENTS

Hereinafter, embodiments of the present disclosure will be described with reference to the accompanying drawings.

Figure 1:
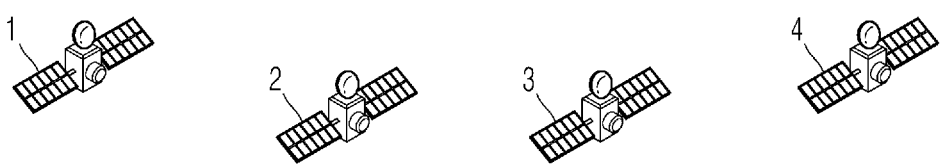
FIG. 1 illustrates a GNSS positioning environment to which the present disclosure is applied.
Figure 1:
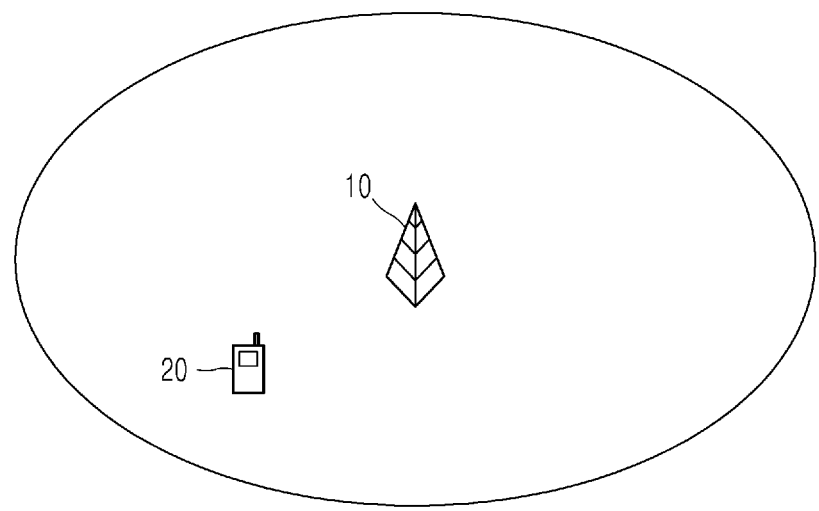

FIG. 1 illustrates a Global Navigation Satellite System (GNSS) positioning environment to which the present disclosure is applied.

In FIG. 1, it is assumed that a terminal 20 using a communication service within a cell of a Base Station (BS) 10 is a positioning target for convenience of description.

The GNSS positioning scheme is a most widely used positioning technology for measuring (estimating) a location of the positioning target, that is, the terminal 20. The GNSS positioning scheme is a scheme of deriving a positioning result on the basis of a satellite measurement value obtained by measuring a satellite signal, where the satellite signal is received from a satellite (for example, satellite 1, 2, 3, or 4) by a GNSS receiver included in the positioning target, that is, the terminal 20.

Of course, the entity for deriving the positioning result of the terminal 20 on the basis of the satellite measurement value may be the terminal 20 or a separate device (for example, a server) which can receive the satellite measurement value from the terminal 20.

In the GNSS positioning scheme, two factors may be defined to influence the positioning error.

One factor is an error in a satellite measurement value (for example, a pseudo-distance measurement value) obtained by measuring a satellite signal received by the GNSS receiver and the other factor is the geometrical location relation (Dilution Of Precision (DOP)) between the GNSS receiver and all satellites used for positioning.

Accordingly, in the GNSS positioning scheme, it is possible to reduce the positioning error by improving the error in the satellite measurement value (for example, the pseudo-distance measurement value) and the DOP.

In the prior arts, various schemes to reduce a positioning error by detecting and removing the error in the satellite measurement value (for example, the pseudo-distance measurement value) by the GNSS receiver are used, and a representative scheme thereof is a Receiver Autonomous Integrity Monitoring (RAIM) scheme.

The RAIM scheme is a scheme for calculating a residual using the positioning result and detecting the error in the satellite measurement value (for example, the pseudo-distance measurement value) using a statistical characteristic of the residual.

However, in the case of the RAIM scheme, it is assumed that a single measurement value has an error among a plurality of satellite measurement values used for positioning.

Accordingly, if the terminal (generally including the GNSS receiver) is in an inadequate environment such as downtown/indoors near a window, the RAIM scheme may have an error in the satellite measurement value due to complex multiple paths and it is difficult to detect the error.

Meanwhile, in order to theoretically improve the DOP, all available satellite measurement values are used for positioning, thereby reducing (minimizing) the positioning error.

However, in reality, the number of visible satellites which can be used for positioning may be insufficient in downtown/indoors near a window or a satellite signal may be received only in a specific direction, so the DOP may deteriorate.

Particularly, when the number of satellites is smaller than a threshold value (for example, four), positioning itself may be impossible and thus a positioning success rate may also be reduced.

Accordingly, the present disclosure proposes an improved positioning scheme which can increase a positioning success rate and further accurately detect an error in a satellite measurement value even when a location of a terminal in an inadequate environment such as downtown/indoors near a window is measured.

Hereinafter, it will be described with reference to FIG. 2 that a configuration of an apparatus for measuring a location of a terminal according to an embodiment of the present disclosure so as to realize an improved positioning scheme proposed by the present disclosure.

Figure 2:
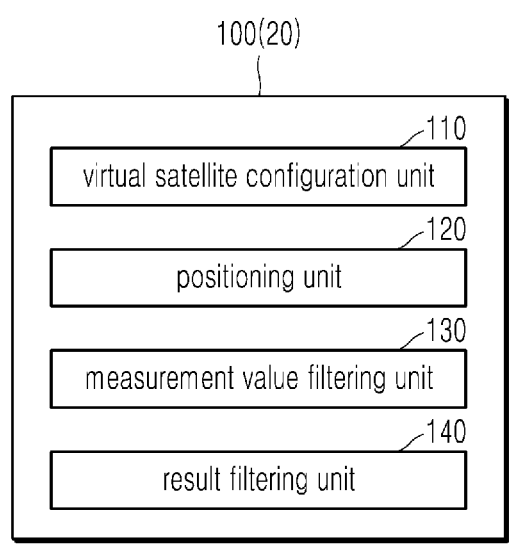
FIG. 2 is a block diagram illustrating a configuration of an apparatus for positioning a terminal according to an embodiment of the present disclosure.

As illustrated in FIG. 2, for a specific terminal, the apparatus 100 for positioning the terminal according to the present disclosure includes a virtual satellite configuration unit 110 configured to configure a virtual satellite on the basis of a BS coordinate of a serving BS related to a specific terminal and a positioning unit 120 configured to perform a positioning procedure for estimating a location of the specific terminal on the basis of a pseudo-distance measurement value of an actual satellite measured by the specific terminal and a distance measurement value of a virtual satellite generated for the virtual satellite.

The apparatus 100 for positioning the terminal according to the present disclosure may further include a measurement value filtering unit 130 and a result filtering unit 140.

For convenience of description, it is assumed that a specific terminal which is a positioning target is the terminal 20 capable of using a communication service within a cell of the BS 10 as illustrated in FIG. 1.

That is, hereinafter, it is assumed that the apparatus 100 for positioning the terminal according to the present disclosure measures (estimates) the location of the terminal 20.

At this time, the apparatus 100 for positioning the terminal according to the present disclosure may be a device which is the same as the terminal 20 or a separate device (for example, a server) which can receive a satellite measurement value from the terminal 20.

The apparatus 100 for positioning the terminal according to the present disclosure improves DOP when the terminal 20 is in an inadequate environment such as downtown/indoors near a window by configuring a virtual satellite and deriving a positioning result of the terminal (location coordinates or a clock error) on the basis of the actual satellite and the virtual satellite.

Hereinafter, a process (hereinafter, referred to as a virtual satellite-based positioning procedure) for deriving a result of measuring the location of the terminal 20 through the virtual satellite will be described in detail.

For the terminal 20 which is a positioning target, the virtual satellite configuration unit 110 configures a virtual satellite on the basis of a BS coordinate of the serving BS 10 related to the terminal 20.

More specifically, for the terminal 20 which is a positioning target, the apparatus 100 for positioning the terminal may determine whether the number of satellites, that is, visible satellites which can be used for positioning is smaller than a threshold value (for example, four).

Accordingly, the apparatus 100 for positioning the terminal may determine to perform the virtual satellite-based positioning procedure on the terminal 20 when the number of visible satellites is smaller than the threshold value (for example, four), and determine to perform a normal positioning procedure using only the actual satellites on the terminal 20 as per convention when the number of visible satellites is not smaller than the threshold number (for example, four).

For the terminal 20 which is a positioning target, the virtual satellite configuration unit 110 may configure the virtual satellite when the virtual satellite-based positioning procedure is performed, that is, only when the number of visible satellites is smaller than the threshold number (for example, four).

For the terminal 20, the virtual satellite configuration unit 110 configures the virtual satellite on the basis of a reference coordinate related to the terminal 20.

Since it has been assumed that the terminal 20 is the terminal accessing the BS 10 to use the communication service, the reference coordinate related to the terminal 20 is a BS coordinate of the serving BS 10.

That is, for the terminal 20, the virtual satellite configuration unit 110 configures the virtual satellite on the basis of the BS coordinate of the serving BS 10.

Specifically, the virtual satellite configuration unit 110 may configure the virtual satellite on the basis of a coordinate value of each directional axis for the BS coordinate in a three-dimensional coordinate space having an initial location coordinate of terminal 20 or a location coordinate estimated during the previous positioning procedure as the origin.

Figure 3:
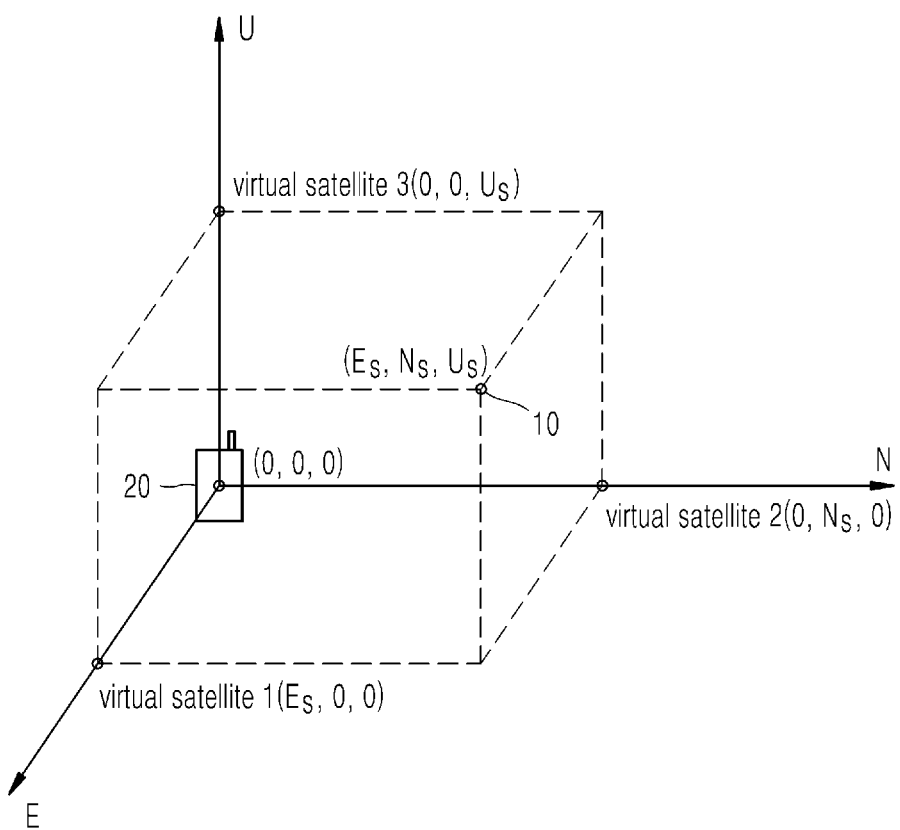
FIG. 3 illustrates a concept of configuring virtual satellites according to an embodiment of the present disclosure.

In a specific description made with reference to FIG. 3, the virtual satellite configuration unit 110 may assume the three-dimensional coordinate space having the initial location coordinate of the terminal 20 or the location coordinate estimated during the previous positioning procedure as the origin.

The initial location coordinate of the terminal 20 is a location coordinate ($R_u$) of an initial location state (initial state, $\bar{x}=[R_u^T B_u]^T=[x_u y_u z_u B_u]^T$) assumed for the terminal 20 in a positioning procedure described below. $B_u$ denotes a clock error.

Meanwhile, in the positioning procedure described below, when a location state) ($\hat{x}$) estimated using $\bar{x}$ for the terminal 20 does not satisfy a preset condition ($\delta=|\hat{x}-\bar{x}|<\varepsilon$), the estimated location state is not output as the location positioning result and a previous $\bar{x}$ is updated to $\hat{x}$ to be used for the next positioning procedure.

The location coordinate of the terminal 20 estimated during the previous positioning procedure is a location coordinate (Ru) of the latest location state ($\bar{x}$) which is to be updated to $\hat{x}$ in the positioning procedure described below.

Accordingly, in an initial stage of initiating the position procedure of the terminal 20, the virtual satellite configuration unit 110 may assume a three-dimensional coordinate space of FIG. 3 having the initial location coordinate of the terminal 20, that is, the location coordinate (Ru) of the initial state $\bar{x}$ as the origin.

Meanwhile, while the positioning procedure is being performed for the terminal 20, the virtual satellite configuration unit 110 may assume a three-dimensional coordinate space of FIG. 3 having the location coordinate of the terminal 20 estimated in the previous positioning procedure, that is, the location coordinate (Ru) of the latest location state ($\bar{x}$) as the origin.

The virtual satellite configuration unit 110 may configure a maximum of three virtual satellites 1, 2, and 3 in the three-dimensional coordinate space on the basis of a coordinate value ES, NS, US of each directional axis for the BS coordinate (ES, NS, US) applied to (replaced with) the three-dimensional coordinate space of FIG. 3 having the terminal 20 (Ru) as the origin.

In the simplest embodiment, as illustrated in FIG. 3, the virtual satellite configuration unit 110 may configure a maximum of three virtual satellites 1, 2, and 3 on each directional axis (E,N,U) of the three-dimensional coordinate space on the basis of the coordinate value ES, NS, US for each directional axis within the BS coordinate (ES, NS, US).

That is, the virtual satellite configuration unit 110 may configure virtual satellite 1 having a coordinate (ES,0,0), virtual satellite 2 having a coordinate (0,NS,0), and virtual satellite 3 having a coordinate (0,0, US) in the three-dimensional coordinate space of FIG. 3.

For the coordinates of the virtual satellite described below, the coordinates of the virtual satellite configured in the three-dimensional coordinate space are understood as coordinates replaced with coordinates of an actual coordinate space (X,Y,Z).

The positioning unit 120 performs a positioning procedure for estimating (measuring) the location of the terminal 20 on the basis of a pseudo-distance measurement value of the actual satellite measured by the terminal 10 and a distance measurement value of the virtual satellite generated for the virtual satellite.

The actual satellite is a visible satellite of which a satellite signal is received by the terminal 20 (generally including a GNSS receiver) at a time point at which the location of the terminal 20 is measured, and hereinafter it is assumed that actual satellites are satellites 1, 2, and 3 illustrated in FIG. 1 for convenience of description.

The apparatus 100 for positioning the terminal may know a satellite measurement value (hereinafter, referred to as a pseudo distance measurement value $\rho^j$ (=a pseudo distance measurement value of an actual satellite j)) obtained by measuring a satellite signal received from each of actual satellites 1, 2, and 3 by the terminal 20, and know a coordinate $R^j=[x^j y^j z^j]^T$ of each of the actual satellites 1, 2, and 3 measured by the terminal 20.

Meanwhile, since satellite signals of virtual satellites 1, 2, and 3 that do not really exist cannot be measured, the apparatus 100 for positioning the terminal calculates and generates a satellite measurement value (hereinafter, referred to as a distance measurement value $\rho_{BS}^k$ (=distance measurement value of a virtual satellite k)) of each of the virtual satellites 1, 2, and 3.

That is, the apparatus 100 for positioning the terminal (particularly, the positioning unit 120) may calculate and generate the distance measurement value $\rho_{BS}^k$ of each of the virtual satellites 1, 2, and 3 on the basis of the initial location coordinate (that is, the location coordinate (Ru) of the initial state $\bar{x}$) of the terminal 20 or the location coordinate (that is, the location coordinate (Ru) of the updated latest location state ($\bar{x}$)) estimated during the previous positioning procedure.

For example, the virtual distance measurement value may be calculated according to Equation (1) below.

$$\rho_{BS}^k = |R_{BS}^k - R_u| \qquad (1)$$

$R_{BS}^k$ a coordinate of a virtual satellite k configured using a coordinate of the serving BS.

That is, when it is assumed that the terminal 20 receives a satellite signal of the virtual satellite k by calculating a distance between the coordinate $R_{BS}^k$ of the virtual satellite k and the location coordinate ($R_u$) of the terminal 20, the positioning unit 120 generates a satellite measurement value (pseudo distance measurement value) of the virtual satellite k.

Thereafter, like the general positioning procedure of deriving the location positioning result on the basis of the satellite measurement value, the positioning unit 120 performs a positioning procedure on the basis of the satellite measurement value (including pseudo distance measurement values of actual satellites 1, 2, and 3 and distance measurement values of virtual satellites 1, 2, and 3).

Specifically, the positioning unit 120 estimates the location coordinate of the terminal 20 using a predefined weight matrix and at least one formula matrix configured on the basis of the pseudo measurement values of actual satellites 1, 2, and 3 and the distance measurement values of virtual satellites 1, 2, and 3 in order to estimate the location of the terminal 20.

At this time, the type and form of the configured formula matrix and the type and form of the weight matrix may vary depending on an algorithm adopted during the positioning procedure and, hereinafter, an embodiment will be described for convenience of description.

For example, the positioning unit 120 may configure a navigation matrix H for each satellite (including actual and virtual satellites) on the basis of the pseudo measurement values of actual satellites 1, 2, and 3 and the distance measurement values of virtual satellites 1, 2, and 3 and configure a measurement value vector matrix $\tilde{z}$ for the satellite measurement value (the measured pseudo distance measurement value and the calculated/measured distance measurement value) for each satellite (including actual and virtual satellites).

Further, the positioning unit 120 may estimate the location coordinate of the terminal 20 using the configured navigation matrix H, the measurement value vector matrix $\tilde{z}$, and the predefined weight matrix W.

Hereinafter, among algorithms that can be adopted to estimate the location coordinate of the terminal 20, a weighted least square method-based algorithm will be described according to an embodiment.

In this case, for example, the positioning unit 120 may estimate the location state ($\hat{x}$) of the terminal 20 on the basis of the navigation matrix H, the measurement value vector matrix $\tilde{z}$, and the weight matrix W according to Equation (2) below.

$$\hat{x} = (H^T W H)^{-1} H^T W \tilde{z} \quad \text{Equation (2)}$$

As described above, the positioning unit 120 may estimate the location coordinate (Ru) of the terminal 20, that is, the location coordinate of the location state ($\hat{x}$) by estimating the location state ($\hat{x}$) of the terminal 20 on the basis of the navigation matrix H, the measurement value vector matrix $\tilde{z}$, and the weight matrix W.

At this time, it is preferable that the weight matrix W used by the present disclosure is defined to apply a lower weighted value to a value related to a virtual satellite compared to an actual satellite.

In general, each weighted value configuring the weight matrix is configured on the basis of an elevation for each satellite and a signal quality (SNR) used for positioning, and it is required to reflect the same because a virtual satellite having lower reliability than an actual satellite is used in the present disclosure.

Accordingly, when performing the virtual satellite-based positioning procedure, the positioning unit 120 may use the weight matrix W defined to apply the lower weighted value to the value related to the virtual satellite compared to the actual satellite.

Thereafter, when a difference between the location coordinate (Ru) estimated this time and the initial location coordinate (that is, the location coordinate (Ru) of the initial state $\bar{x}$) of the terminal 20 or the location coordinate (that is, the location coordinate (Ru) of the updated latest location state ($\bar{x}$) estimated during the previous positioning procedure is within a preset specific range ($\varepsilon$), the positioning unit 120 outputs the location coordinate (Ru) estimated this time as the positioning result of the terminal 20.

More specifically, the difference ($\delta$) between the location coordinate (Ru) estimated this time and the initial location coordinate (that is, the location coordinate (Ru) of the initial state) $\bar{x}$) of the terminal 20 or the location coordinate (that is, the location coordinate (Ru) of the updated latest location state ($\bar{x}$)) estimated during the previous positioning procedure may be defined by Equation (3) below.

$$\delta = |\hat{x} - \bar{x}| \quad \text{Equation (3)}$$

Accordingly, at an initial stage of the procedure of positioning the terminal 20, the positioning unit 120 determines whether the difference ($\delta$) between the location coordinate ($R_u$) estimated this time and the initial location coordinate (that is, the location coordinate ($R_u$) of the initial state $\bar{x}$) of the terminal 20 or the location coordinate (that is, the location coordinate ($R_u$) of the updated latest location state ($\bar{x}$)) estimated during the previous positioning procedure is within the specific range ($\varepsilon$), determines that a preset condition ($\delta = |\hat{x} - \bar{x}| < \varepsilon$) is satisfied when the difference is within the specific range ($\varepsilon$), and outputs the location coordinate ($R_u$) estimated this time, that is, the location state ($\hat{x}$) as the positioning result of the terminal 20.

Meanwhile, when the positioning procedure for the terminal 20 is being performed, the positioning unit 120 determines whether the difference ($\delta$) between the location coordinate (Ru) estimated this time and the location coordinate of the terminal 20 estimated during the previous positioning procedure, that is, the location coordinate (Ru) of the latest location state ($\bar{x}$) updated to $\hat{x}$ is within the specific range ($\varepsilon$), determines that a preset condition ($\delta = |\hat{x} - \bar{x}| < \varepsilon$) is satisfied when the difference is within the specific range ($\varepsilon$), and outputs the location coordinate (Ru) estimated this time as the positioning result of the terminal 20.

On the other hand, when the difference ($\delta$) exceeds the specific range ($\varepsilon$), the positioning unit 120 determines that a preset condition $\delta = |\hat{x} - \bar{x}| < \varepsilon$ is not satisfied and updates the previous $\bar{x}$ to $\hat{x}$ so that $\hat{x}$ can be used for the next positioning procedure without outputting the location coordinate (Ru) estimated this time, that is, the location state ($\hat{x}$) as the positioning result of the terminal 20.

Further, when the difference ($\delta$) exceeds the specific range ($\varepsilon$), that is, when the condition is not satisfied, the positioning unit 120 performs again the positioning procedure of the terminal 20 (next positioning procedure).

That is, the positioning unit 120 may perform again the positioning procedure of estimating the location state ($\hat{x}$) of the terminal 20 on the basis of the distance measurement values of virtual satellites 1, 2, and 3 calculated/generated using the pseudo distance measurement values of actual satellites 1, 2, and 3 measured by the terminal 20 and the updated latest location state ($\bar{x}$) of the terminal 20.

The positioning procedure performed again may be repeated until the estimated location coordinate (Ru), that is, the location state ($\hat{x}$) satisfies a condition ($\delta = |\hat{x} - \bar{x}| < \varepsilon$).

Meanwhile, according to another embodiment, when the difference ($\delta$) exceeds the specific range ($\varepsilon$), that is, the condition is not satisfied, the positioning unit 120 may perform again the positioning procedure of the terminal 20 (next positioning procedure) after configuring again the virtual satellites, and the positioning procedure performed again may be repeated until the estimated location coordinate (Ru), that is, the location state ($\hat{x}$) satisfies the condition ($\delta = |\hat{x} - \bar{x}| < \varepsilon$).

As described above, the present disclosure may implement the improved positioning procedure (scheme) based on the virtual satellite for configuring virtual satellites in consideration of a situation in which the number of visible satellites is insufficient downtown/indoors near a window and deriving the positioning result of the terminal 20 ($\hat{x}$=location coordinate, clock error) using actual satellites and virtual satellites, thereby improving the DOP.

Subsequently, the apparatus 100 for positioning the terminal according to the present disclosure improves an error in the satellites measurement value through the improved scheme using the positioning result ($\hat{x}$=location coordinate and clock error) output through the improved positioning procedure (scheme) based on virtual satellites described above.

The measurement value filtering unit 130 calculates a residual for each of the actual satellites and the virtual satellites used for the positioning procedure on the basis of the location coordinate of the terminal 20 output as the positioning result in the above-described positioning procedure.

Hereinafter, for convenience of description, it is assumed that the location state ($\hat{x}$) is output as the positioning result in the positioning result using actual satellites 1, 2, and 3, and virtual satellites 1, 2, and 3.

The measurement value filtering unit 130 calculates a residual for each satellite on the basis of the location coordinate (Ru) of the location state ($\hat{x}$) of the terminal 20 output as the positioning result and the coordinate of each of actual satellites 1, 2, and 3, and virtual satellites 1, 2, and 3.

The following description is made simply on the basis of actual satellite 1 and virtual satellite 1.

In the case of actual satellite 1, a difference (pseudo distance measurement value–pseudo distance estimation value) between a pseudo distance measurement value of actual satellite 1 measured by the terminal 20 and a pseudo distance estimation value of actual satellite 1 estimated by a distance calculation value calculated by a location coordinate (Ru) and a coordinate of actual satellite 1 and a clock error calculation value corresponds to a residual of actual satellite 1.

In the case of virtual satellite 1, a difference (distance measurement value−distance estimation value) between a previously calculated/generated distance measurement value of virtual satellite 1 and a distance estimation value of virtual satellite 1 estimated by the location coordinate (Ru) and a distance calculation value calculated by a coordinate of virtual satellite 1 corresponds to a residual of virtual satellite 1.

When a residual is calculated for each of the satellites (actual satellites 1, 2, and 3, and virtual satellites 1, 2, and 3), if a combination of calculated residuals or a maximum size of the residual is larger than or equal to a preset threshold value, the measurement value filtering unit 130 may perform a different measurement value filtering procedure according to whether the maximum size of the residual is calculated for the actual satellite or the virtual satellite.

For example, when a combination of the residuals of satellites is larger than or equal to a first threshold value or when the maximum size of the calculated residual is larger than or equal to a second threshold value, the measurement value filtering unit 130 determines that there is an error (mistake) in a satellite measurement value (a pseudo distance measurement value of the actual satellite or a distance measurement value of the virtual satellite) and identifies whether the maximum size of the calculated residual is for the actual satellite or the virtual satellite.

Accordingly, when it is identified that the maximum size of the residual is for the actual satellite (for example, actual satellite 1), the measurement value filtering unit 130 performs a measurement value filtering procedure by removing actual satellite 1 of the maximum residual (pseudo distance measurement value of actual satellite 1).

For the terminal 20, the apparatus 100 for positioning the terminal according to the present disclosure may perform an initial step of the positioning for determining whether to perform a general positioning procedure or a virtual satellite-based positioning procedure on the basis of the remaining actual satellites (for example, actual satellite 2 and 3) after filtering the measurement values.

Meanwhile, when it is identified that the maximum size of the residual is for the virtual satellite (for example, virtual satellite 1), the measurement value filtering unit 130 may perform again the positioning procedure for the terminal 20 after removing the remaining virtual satellites other than a specific virtual satellite configured in an altitude direction of the terminal 20 among the virtual satellites used for the positioning procedure.

At this time, the reason for removing the remaining virtual satellites other than the virtual satellites in the altitude direction is that there is ambiguity of several kilometers corresponding to a cell radius of the BS 10 in the case of a horizontal direction but there is a little change in the case of an altitude direction and thus the terminal 20 exists within a range of hundreds of meters even in a conservative estimation.

That is, when it is identified that the maximum size of the residual is for the virtual satellite (for example, virtual satellite 1), the measurement value filtering unit 130 may perform the measurement value filtering procedure by removing the remaining virtual satellites 1 and 2 other than a specific virtual satellite (referring to FIG. 3, virtual satellite 3) configured in an altitude direction of the terminal 20 among virtual satellites 1, 2, and 3.

Further, for the terminal 20, the apparatus 100 for positioning the terminal (particularly, the positioning unit 120) according to the present disclosure may output the positioning result by performing the virtual satellite-based positioning procedure using the remaining satellites after filtering the measurement values, that is, actual satellites 1, 2, and 3, and virtual satellite 3.

In addition, when the positioning result of the terminal 20 is output in the virtual satellite-based positioning procedure performed after the measurement value filtering for removing the virtual satellite, the measurement value filtering unit 130 may calculate a residual for each satellite again and identify whether a combination of calculated residuals or a maximum size of the residual is reduced compared to the state right before the measurement value filtering.

When a combination of the residuals or a maximum size of the residual is reduced compared to the state right before the measurement value filtering, the measurement value filtering unit 130 may select the positioning result as the final output for the terminal 20.

When a combination of the residuals or a maximum size of the residual is not reduced compared to the state right before the measurement value filtering, the measurement value filtering unit 130 may select the positioning result right before the measurement value filtering as the final output of the terminal 20.

Of course, the measurement value filtering unit 130 may select the positioning result of the terminal 20 in the virtual satellite-based positioning procedure performed after the measurement value filtering for removing the virtual satellite as the final output for the terminal 20.

As described above, the present disclosure realizes an improved filtering procedure (scheme) based on virtual satellites for more accurately detecting/removing an error in a satellite measurement value (a pseudo distance measurement value of an actual satellite or a distance measurement value of a virtual satellite) when the location of the terminal is measured using virtual satellites in consideration of a situation in which the error in the satellites measurement value can be generated due to complex multiple paths.

Further, the apparatus 100 for positioning the terminal according to the present disclosure further proposes a scheme for additionally filtering whether there is an error in the poisoning result ($\hat{x}$) of the terminal 10 selected as the final output as described above.

Specifically, the result filtering unit 140 calculates a residual for each of the actual satellites and the virtual satellites used for the positioning procedure on the basis of a specific location coordinate (Ru) output as the final positioning result ($\hat{x}$) after the measurement value filtering unit 130 performs the measurement value filtering procedure.

At this time, since the residual calculation process is the same as the above-described residual calculation process, a description thereof will be omitted.

The result filtering unit 140 may finally filter whether there is an error in the final positioning result ($\hat{x}$) on the basis of the calculated residual for each satellite and an altitude value of the specific location coordinate (Ru).

For example, when the result of a combination of the calculated residual for each satellite and the altitude value of the specific location coordinate (Ru) is out of a predefined filtering range, the result filtering unit 140 may finally filter the final positioning result ($\hat{x}$) as the error.

More specifically, on the basis of the final positioning result, the result filtering unit 140 may obtain, as the combination of the residual and the altitude, an absolute value acquired by multiplying the maximum size of the residual and a difference value between the altitude value of the specific location coordinate (Ru) which can be considered as an altitude location of the terminal 20 and an altitude value of the BS coordinate of the serving BS 10.

When the absolute value obtained as the result of the combination of the residual and the altitude is out of the filtering range, the result filtering unit 140 may finally filter the final positioning result ($\hat{x}$) as the error.

The final filtering also results from the fact that there is little change in the case of an altitude direction and thus the terminal 20 exists within a range of hundreds of meters even in a conservative estimate.

As described above, the apparatus 100 for positioning the terminal of the present disclosure may configure virtual satellites, realize an improved positioning procedure (scheme) based on virtual satellites for measuring (estimating) a location of the terminal 20 using actual satellites and virtual satellites, and further realize an improved positioning procedure (scheme) based on virtual satellites for more accurately detecting/removing an error in satellite measurement values (pseudo distance measurement value of the actual satellite and distance measurement value of the virtual satellite) when the location of the terminal is measured using the virtual satellites.

According to the present disclosure, through the improved virtual satellite-based positioning procedure (scheme) and the improved filtering procedure (scheme), it is possible to derive an effect of increasing a positioning success rate and reducing a positioning error with high reliability even when a location of a terminal in an inadequate environment is measured by improving DPS and removing an error in a satellite measurement value.

Figure 4:
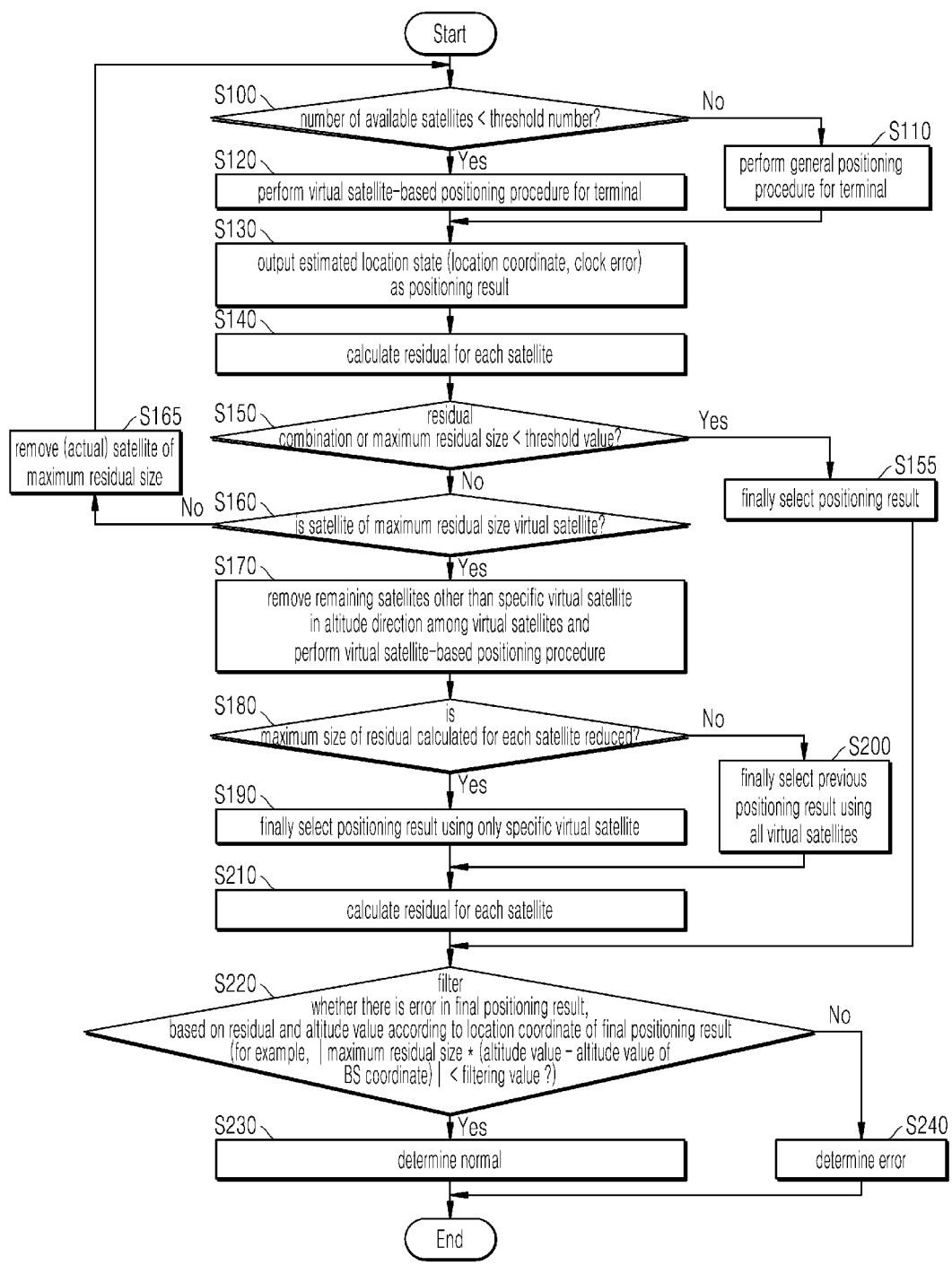
FIGS. 4 and 5 are flowcharts illustrating the flow of a method of positioning a terminal according to an embodiment of the present disclosure.

Hereinafter, a method of positioning a terminal according to an embodiment of the present disclosure will be described with reference to FIGS. 4 and 5. However, the reference numerals used in FIGS. 1 to 3 are employed for convenience of description.

First, the method of positioning the terminal according to the present disclosure is described with reference to FIG. 4.

Hereinafter, for convenience of description, it is assumed that a specific terminal which is a positioning target is the terminal 20 illustrated in FIG. 1.

In the method of positioning the terminal according to the present disclosure, for the terminal 20, the apparatus 100 for positioning the terminal may determine whether the number of satellites which can be used for positioning, that is, the number of visible satellites is smaller than a threshold value (for example, four).

In the method of positioning the terminal according to the present disclosure, for the terminal 20, the apparatus 100 for positioning the terminal may perform a virtual satellite-based positioning procedure for the terminal 20 in S120 when the number of visible satellites is smaller than a threshold number (for example, four) (Yes of S100), and performs the existing general positioning procedure using only actual satellites for the terminal 20 in S110 when the number of visible satellites is not smaller than the threshold number (for example, four) (No of S100).

For convenience of description, it is assumed that actual satellites which can be used for positioning the terminal 20 are satellites 1, 2, and 3.

Hereinafter, a process of the virtual satellite-based positioning procedure will be described in detail with reference to FIG. 5.

Figure 5:
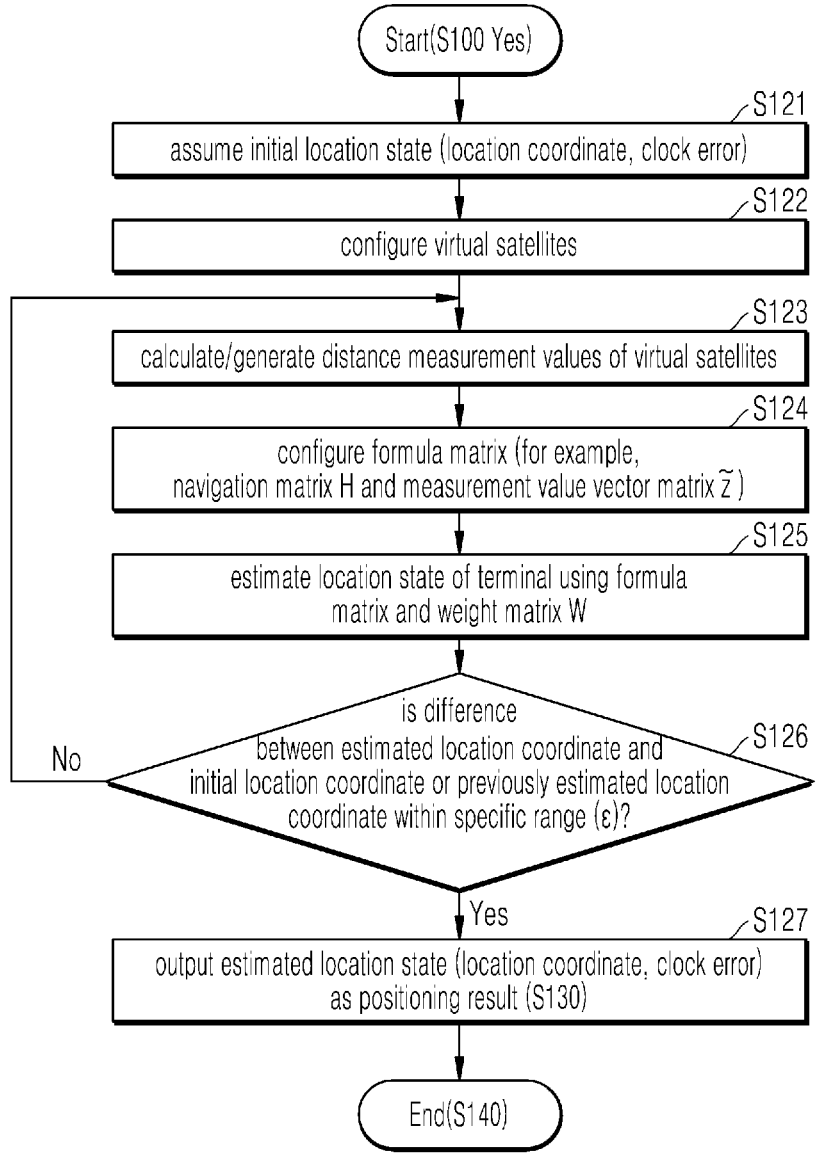

As illustrated in FIG. 5, in the method of positioning the terminal according to the present disclosure, the apparatus 100 for positioning the terminal assumes an initial location state (initial state, $\bar{x}=[R_u^T B_u]^T=[x_u y_u z_u B_u]^T$) of the terminal 20 in S121.

Further, in the method of positioning the terminal according to the present disclosure, the apparatus 100 for positioning the terminal configures virtual satellites using the BS coordinate of the serving BS 10 of the terminal 20 on the basis of the initial location coordinate of the terminal 20, that is, the initial state $\bar{x}$ in S122.

Specifically, in the method of positioning the terminal according to the present disclosure, the apparatus 100 for positioning the terminal assumes the three-dimensional coordinate space of FIG. 3 having the initial location coordinate of the terminal 20, that is, the location coordinate (Ru) of the initial state $\bar{x}$ as the origin.

In the method of positioning the terminal according to the present disclosure, the apparatus 100 for positioning the terminal may configure a maximum of three virtual satellites 1, 2, and 3 in the three-dimensional coordinate space on the basis of a coordinate value ES, NS, US for each directional axis within the BS coordinate (ES, NS, US) applied to (replaced with) the three-dimensional coordinate space of FIG. 3 having the actual terminal 20 (Ru) as the origin in S122.

According to the simplest embodiment, in the method of positioning the terminal according to the present disclosure, the apparatus 100 for positioning the terminal may configure a maximum of three virtual satellites 1, 2, and 3 on each directional axis (E,N,U) of the three-dimensional coordinate space of FIG. 3.

For the coordinate of the virtual satellite described below, the coordinate of the satellite configured in the three-dimensional coordinate space is understood as a coordinate replaced with a coordinate of an actual coordinate spate (X,Y,Z).

Thereafter, in the method of positioning the terminal according to the present disclosure, the apparatus 100 for positioning the terminal calculates and generates distance measurement values of the virtual satellites configured in S122 in S123.

In the method of positioning the terminal according to the present disclosure, the apparatus 100 for positioning the terminal may use all of a maximum of three virtual satellites 1, 2, and 3 configured in S122, but may select and use only some of the three virtual satellites for positioning.

Hereinafter, an embodiment of using all of the three virtual satellites 1, 2, and 3 for positioning will be described.

In this case, in the method of positioning the terminal according to the present disclosure, when it is assumed that a distance between a coordinate ($R_{BS}^k$) of a virtual satellite k and the location coordinate (Ru) of the terminal 20 is calculated for each of virtual satellites 1, 2, and 3 and the terminal 20 receives a satellite signal of the virtual satellite k, the apparatus 100 for positioning the terminal may generate a satellite measurement value (pseudo distance measurement value) of the virtual satellite k in S123.

Thereafter, in the method of positioning the terminal according to the present disclosure, the apparatus 100 for positioning the terminal may configure a navigation matrix H for each satellite (including the actual and virtual satellites) on the basis of pseudo distance measurement values of actual satellites 1, 2, and 3, and distance measurement values of virtual satellites 1, 2, and 3 and configure a measurement value vector matrix $\tilde{z}$ for a satellite measurement value (measured pseudo distance measurement value and calculated/generated distance measurement value) for each satellite (including actual and virtual satellites) in S124.

In the method of positioning the terminal according to the present disclosure, the apparatus 100 for positioning the terminal may estimate the location coordinate of the terminal 20 using the configured navigation matrix H, the measurement value vector matrix ž, and a predefined weight matrix W in S125.

That is, in the method of positioning the terminal according to the present disclosure, the apparatus 100 for positioning the terminal may estimate the location state ($\hat{x}$) of the terminal 20 through a weighted least square method using the navigation matrix H, the measurement value vector matrix ž, and the weight matrix W according to Equation (2) above, thereby estimating the location coordinate (Ru) of the terminal 20, that is, the location coordinate of the location state ($\hat{x}$).

At this time, the weight matrix W used by the present disclosure may be defined to apply a lower weighted value to a value related to the virtual satellite compared to the actual satellite.

Thereafter, in the method of positioning the terminal according to the present disclosure, the apparatus 100 for positioning the terminal determines whether a difference ($\delta$) between the location coordinate (Ru) estimated in S125 and the initial location coordinate of the terminal 20 (that is, the location coordinate (Ru) of the initial state $\bar{x}$) is within a specific range ($\varepsilon$) in S126.

In the method of positioning the terminal according to the present disclosure, when the difference ($\delta$) is within the specific range ($\varepsilon$) (Yes of S126), the apparatus 100 for positioning the terminal determines that a preset condition ($\delta=|\hat{x}-\bar{x}|<\varepsilon$) is satisfied and outputs the location coordinate (Ru) estimated this time, that is, the location state ($\hat{x}$) as the position result of the terminal 20 in S127.

On the other hand, in the method of positioning the terminal according to the present disclosure, when the difference ($\delta$) exceeds the specific range ($\varepsilon$) (No of S126), the apparatus 100 for positioning the terminal determines that a preset condition ($\delta=|\hat{x}-\bar{x}|<\varepsilon$) is not satisfied, updates the previous $\hat{x}$ to $\bar{x}$ so $\hat{x}$ that can be used for the next positioning procedure, and returns to S123 without outputting the location coordinate (Ru) estimated this time, that is, the location state ($\hat{x}$) as the positioning result.

In the method of positioning the terminal according to the present disclosure, the apparatus 100 for positioning the terminal may perform again the positioning procedure of estimating the location state ($\hat{x}$) of the terminal 20 on the basis of the pseudo distance measurement values of actual satellites 1, 2, and 3 measured by the terminal 20 and distance measurement values of virtual satellites 1, 2, and 3 calculated and generated using the latest location state ($\bar{x}$) of the terminal via S123 to S125.

The positioning procedure performed again may be repeated until the estimated location coordinate (Ru), that is, the location state ($\hat{x}$) satisfies the condition ($\delta=|\hat{x}-\bar{x}|<\varepsilon$) in S126.

Referring back to FIG. 4, in the method of positioning the terminal according to the present disclosure, when the estimated location coordinate (Ru), that is, the location state ($\hat{x}$) is output as the positioning result of the terminal 20 in S130 (S127 of FIG. 5), the apparatus 100 for positioning the terminal calculates a residual for each of the actual satellites and the virtual satellites used for the positioning procedure on the basis of the location coordinate (Ru) output as the positioning result in the positioning procedure of the terminal 20 in S140.

Hereinafter, for convenience of description, it is assumed that the location state ($\hat{x}$) is output as the positioning result in the positioning procedure using actual satellites 1, 2, and 3, and virtual satellites 1, 2, and 3.

In the method of positioning the terminal according to the present disclosure, the apparatus 100 for positioning the terminal calculates a residual for each satellite on the basis of the location coordinate (Ru) of the location state ($\hat{x}$) of the terminal 20 output as the positioning result and the coordinate of each of actual satellites 1, 2, and 3, and virtual satellites 1, 2, and 3 in S140.

In the method of positioning the terminal according to the present disclosure, when a combination of the residuals or a maximum size of the residual calculated in S140 is smaller than a preset threshold value (Yes of S150), the apparatus 100 for positioning the terminal finally selects the location state ($\hat{x}$) of the terminal 10 output as the positioning result in S155.

Meanwhile, in the method of positioning the terminal according to the present disclosure, when the combination of the residuals or the maximum size of the residual calculated in S140 is larger than or equal to the preset threshold value (No of S150), the apparatus 100 for positioning the terminal identifies whether the maximum size of the residual is calculated for the actual satellite or the virtual satellites in S160.

In the method of positioning the terminal according to the present disclosure, when it is identified that the maximum size of the residual is for the actual satellite (for example, actual satellite 1) (No of S160), the apparatus 100 for positioning the terminal performs a measurement value filtering procedure by removing actual satellite 1 of the residual of the maximum size (pseudo distance measurement value of actual satellite 1) in S165.

In this case, in the method of positioning the terminal according to the present disclosure, for the terminal 20, the apparatus 100 for positioning the terminal may perform S100 which is an initial step of the positioning for determining whether to perform the general positioning procedure using the remaining actual satellites (for example, actual satellites 2 and 3) after measurement value filtering or the virtual satellite-based positioning procedure.

Meanwhile, in the method of positioning the terminal according to the present disclosure, when it is identified that the maximum size of the residual is for the virtual satellite (for example, virtual satellite 1) (Yes of S160), the apparatus 100 for positioning the terminal may perform the measurement value filtering procedure by removing the remaining virtual satellites 1 and 2 other than a specific virtual satellite (referring to FIG. 3, virtual satellite 3) configured in the altitude direction of the terminal 20 among virtual satellites 1, 2, and 3 used for the positioning procedure in S170.

In the method of positioning the terminal according to the present disclosure, for the terminal 20, the apparatus 100 for positioning the terminal outputs the positioning result by performing the virtual satellite-based positioning procedure using the remaining satellites after measurement value filtering of S170, that is, actual satellites 1, 2, and 3 and virtual satellite 3 in S170.

In the method of positioning the terminal according to the present disclosure, when the positioning result of the terminal 20 is output in the virtual satellite-based positioning procedure performed after the measurement value filtering for removing the virtual satellites in S170, the apparatus 100 for positioning the terminal calculates again a residual of each satellite and identifies whether a combination of calculated residuals or a maximum size of the residual is reduced compared to that right before the measurement value filtering in S180.

In the method of positioning the terminal according to the present disclosure, the apparatus 100 for positioning the terminal may select the positioning result as the final output of the terminal 20 in S190 when it is identified that the combination or the maximum size is reduced in S180 (Yes of S180), and select the positioning result right before the measurement value filtering as the final output of the terminal 20 in S200 when it is identified that the combination or the maximum size is not reduced in S180 (No of S180).

In the method of positioning the terminal according to the present disclosure, the apparatus 100 for positioning the terminal calculates a residual for each of the actual satellites and the virtual satellites used for the positioning procedure on the basis of a specific location coordinate (Ru) output as the final positioning result ($\hat{x}$) in S210.

In the method of positioning the terminal according to the present disclosure, the apparatus 100 for positioning the terminal may finally filter whether there is an error in the final positioning result ($\hat{x}$) on the basis of the residual for each satellite calculated in S220 and an altitude value of the specific location coordinate (Ru) in S220.

For example, in the method of positioning the terminal according to the present disclosure, when the result of a combination of the calculated residual for each satellite and the altitude value of the specific location coordinate (Ru) is out of a predefined filtering range, the apparatus 100 for positioning the terminal may finally filter the final positioning result ($\hat{x}$) as the error.

More specifically, in the method of positioning the terminal according to the present disclosure, on the basis of the final positioning result, the apparatus 100 for positioning the terminal may obtain, as the combination of the residual and the altitude, an absolute value acquired by multiplying the maximum size of the residual and a difference value between the altitude value of the specific location coordinate (Ru) which can be considered as an altitude location of the terminal 20 and an altitude value of the BS coordinate of the serving BS 10.

The apparatus 100 for positioning the terminal may finally filter the final positioning result ($\hat{x}$) as the error in S240 when the result of the combination of the residual and the altitude is out of the filtering range (No of S220), and finally filter the final positioning result) ($\hat{x}$) as normal in S230 when the result of the combination of the residual and the altitude is within the filtering range (Yes of S220).

As described above, according to the present disclosure, it is possible to improve DOP and remove an error in satellite measurement values, thereby creating an effect of increasing a positioning success rate and reducing a positioning error with high reliability even when a location of a terminal in an inadequate environment such as downtown/indoors near a window is measured.

As described above, the method of positioning the terminal according to an embodiment of the present disclosure may be implemented in the form of a program instructions that can be executed through various computer means, and may be recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. An apparatus for estimating a location of a terminal, the apparatus comprising:
   non-transitory computer readable medium having stored thereon software instructions that, when executed by a processor, cause the processor to:
   configure a virtual satellite for the terminal using a Base Station (BS) coordinate of a serving BS related to the terminal; and
   perform a positioning procedure to estimate the location of the terminal based on a pseudo distance measurement value of an actual satellite measured by the terminal and a distance measurement value of the virtual satellite,
   wherein the virtual satellite is configured using a coordinate value of the BS coordinate along a directional axis of a three-dimensional coordinate space and from an origin corresponding to an initial location coordinate of the terminal or a location coordinate of the terminal estimated in a previous positioning procedure.

2. The apparatus of claim 1, wherein the software instructions further cause the processor to:
   calculate the distance measurement value of the virtual satellite based on the initial location coordinate of the terminal or the location coordinate estimated in the previous positioning procedure, and a coordinate of the virtual satellite.

3. The apparatus of claim 1, wherein the software instructions further cause the processor to:
   estimate a location coordinate of the terminal using a predefined weight matrix and at least one formula matrix configured based on the pseudo measurement value of the actual satellite and the distance measurement value of the virtual satellite; and
   output the estimated location coordinate as a positioning result of the terminal when a difference between the estimated location coordinate and one of the initial location coordinate of the terminal or the location coordinate estimated in the previous positioning procedure is within a preset specific range.

4. The apparatus of claim 3, wherein the software instructions further cause the processor to:
   perform the positioning procedure of the terminal again when the difference between the estimated location coordinate and the initial location coordinate of the terminal or the location coordinate estimated in the previous positioning procedure is out of the specific range.

5. The apparatus of claim 3, wherein the weight matrix is defined to apply a lower weight to a value related to the virtual satellite compared to a value related to the actual satellite.

6. An apparatus for estimating a location of a terminal, the apparatus comprising:
non-transitory computer readable medium having stored thereon software instructions that, when executed by a processor, cause the processor to:
configure a virtual satellite for the terminal using a base station (BS) coordinate of a serving BS related to the terminal;
perform a positioning procedure to estimate the location of the terminal based on a pseudo distance measurement value of an actual satellite measured by the terminal and a distance measurement value generated for the virtual satellite;
calculate a residual for each of the actual satellite and the virtual satellite used in the positioning procedure based on a location coordinate output as a positioning result in the positioning procedure for the terminal; and
perform a different measurement value filtering procedure according to whether a maximum size of the residuals is calculated for the actual satellite or the virtual satellite, when a combination of the residuals or the maximum size of the residuals is larger than or equal to a preset threshold value.

7. The apparatus of claim 6, wherein software instructions further cause the processor to:
configure a plurality of virtual satellites; and
perform the positioning procedure for the terminal again using only a specific one of the plurality of virtual satellites that is configured in an altitude direction of the terminal when the maximum size of the residuals is calculated for the virtual satellite.

8. The apparatus of claim 6, wherein the software instructions further cause the processor to:
re-calculate the residuals for each of the actual satellite and the virtual satellite used for the positioning procedure based on a specific location coordinate output as a final positioning result after performing the different measurement value filtering procedure, and
determine whether there is an error in the final positioning result based on the re-calculated residuals and an altitude value according to the specific location coordinate.

9. A method to estimate a location of a terminal, the method comprising:
configuring a virtual satellite for the terminal using a base station (BS) coordinate of a serving BS related to the terminal; and
performing a positioning procedure to estimate the location of the terminal based on a pseudo distance measurement value of an actual satellite measured by the terminal and a distance measurement value of the virtual satellite,
wherein the virtual satellite is configured using a coordinate value of the BS coordinate along a directional axis of a three-dimensional coordinate space and from an origin corresponding to an initial location coordinate of the terminal or a location coordinate of the terminal estimated in a previous positioning procedure.

10. The method of claim 9, wherein performing the positioning procedure includes:
calculating and generating the distance measurement value of the virtual satellite based on the initial location coordinate of the terminal or the location coordinate estimated in a previous positioning procedure, and the coordinate of the configured virtual satellite;
estimating a location coordinate of the specific terminal using a predefined weight matrix and at least one formula matrix configured based on a pseudo measurement value of the actual satellite and a distance measurement value of the virtual satellite;
outputting the estimated location coordinate as a positioning result of the terminal, when a difference between the estimated location coordinate and one of the initial location coordinate of the specific terminal or the location coordinate estimated in a previous positioning procedure is within a preset specific range; and
performing the positioning procedure of the terminal again when the difference is out of the specific range.

11. The method of claim 10, wherein the weight matrix is defined to apply a lower weight to to the virtual satellite compared to the actual satellite.

12. A method of determining a location of a terminal, the method comprising:
configuring a virtual satellite for the terminal using a base station (BS) coordinate of a serving BS related to the terminal;
performing a positioning procedure to estimate the location of the terminal based on a pseudo distance measurement value of an actual satellite measured by the terminal and a distance measurement value generated for the virtual satellite;
calculating a residual for each of the actual satellite and the virtual satellite used in the positioning procedure based on a location coordinate output as a positioning result in the positioning procedure for the terminal; and
performing a different measurement value filtering procedure according to whether the maximum size of the residuals is calculated for the actual satellite or the virtual satellite, when a combination of the calculated residuals or a maximum size of the residuals is larger than or equal to a preset threshold value.

13. The method of claim 12, wherein:
a plurality of virtual satellites are configured, and
performing the different measurement value filtering procedure includes:
performing the positioning procedure for the terminal again using only a specific one of the plurality of virtual satellites configured in an altitude direction of the terminal when the maximum size of the residuals is calculated for the virtual satellite.

14. The method of claim 12, further comprising:
re-calculating the residuals for each of the actual satellite and the virtual satellite used for the positioning procedure based on a specific location coordinate output as a final positioning result after performing the different measurement value filtering procedure; and
determining whether there is an error in the final positioning result based on the re-calculated residuals and an altitude value according to the specific location coordinate.

* * * * *